2,836,591

Patented May 27, 1958

2,836,591

TREATMENT OF STARCH HYDROLYZATES WITH FORMALDEHYDE UNDER CAREFULLY CONTROLLED CONDITIONS

Harry W. Durand, Glenshaw, Pa., assignor to Corn Products Refining Company, New York, N. Y., a corporation of New Jersey No Drawing. Application October 19, 1953
Serial No. 387,039

3 Claims. (Cl. 260—233.3)

This invention relates to a process for producing from starch hydrolyzates new materials suitable for use as adhesives, sizes, thickening agents, colloid stabilizers and the like.

In U. S. Patent 2,563,014, August 7, 1951, is described a method for producing polymerized carbohydrate materials which have improved properties over previously known dextrin products. However, although such products are superior to any others available, they do lack certain desirable properties. For example, such products when dissolved in water form thin sirups unless the solids content is unusually high. It is not possible to obtain from them pastes with high viscosity at low solids concentration. Regardless of the solids content of the pastes except above 60 to 65 percent, the pastes will be thin, and, of course, cannot be used in certain applications where a thick bodied paste at low solids is required. Thus the method of U. S. Patent 2,563,014 lacks a means of producing materials the viscosity of which can be adjusted over a wide range in addition to the other desired characteristics.

Accordingly, it is an object of this invention to provide a novel adhesive having a wide range of viscosity characteristics and a method for making the same. A further object is to prepare a novel carbohydrate material from starch hydrolyzates. Still a further object is to provide a new method for polymerization of carbohydrate derivatives wherein the degree of polymerization and likewise the properties of the resultant product are adjustable over a wide range. Other objects will appear hereinafter.

I have discovered that these objects may be accomplished by treating starch hydrolyzates with formaldehyde under carefully controlled conditions. The present invention comprises heating dehydrated starch hydrolyzate in contact with formaldeyde under conditions conducive to polymerization.

In carrying out the invention a starch hydrolyzate is prepared in conventional manner, as by acid hydrolysis or enzyme hydrolysis, the former being preferred. The D. E., i. e., percent of reducing sugar, calculated as dextrose, dry basis, should be within the range of about 5 to 40, preferably about 15 to 20. If the D. E. value is below about 15 percent there will be residual starch material present which will exhibit undersirable retrogradative effects, but if this material is removed from the hydrolyzate, as by filtration, prior to polymerization, the resulant product will be satisfactory. After the pH of the hydrolyzate has been adjusted to 4.5 to 5.5, purified and concentrated to about 25 to 28 Bé. in conventional manner, then sufficient commercial 37 percent aqueous formaldehyde to give up to about 2 percent formaldehyde (calculated as anhydrous aldehyde, based on the dried substance) is added and the resultant mixture dehydrated in any suitable manner, as by spray drying, vacuum drying and the like, until the moisture content has been reduced to an amount below about 10 percent, about 2 to about 7 percent being satisfactory. Alternatively, the formaldehyde may be added subsequent to drying in which case it is preferred to use the powdered polymeric form referred to as paraformaldehyde or polyoxymethylene.

The pH of the material undergoing polymerization should be within the range of about 1.5 to 4.5 (determined on 10 percent aqueous solution of the material) during the polymerization. The adjustment of the pH may be made with various acidic materials, e. g., phosphoric acid, hydrochloric acid, boric acid, acid liberating salts, e. g., aluminum chloride hexahydrate. Phosphoric and hydrochloric acids are preferred. The adjustment of the pH may be made after the concentration step and either before or after the dehydration step.

The temperature at which the polymerization reaction proceeds must be carefully regulated to assure the proper rate of polymerization and water formation. Temperature regulation is necessary in order to permit the water, which is formed as the result of the chemical condensation involved, to be continuously removed. The absence of such regulation may result in the interference with polymerization by side reactions, such as hydrolysis and caramelization, resulting from the presence of excessive moisture in the reaction mixture.

Among the types of equipment which may be used for effecting polymerization are heat-jacketed kettles, commonly employed in the commercial manufacture of torrefaction dextrins, tray driers, conveyor belt driers and the like. While the temperature and time cycles will be somewhat variable, depending on the particular characteristics of equipment used, generally, it will be found most satisfactory to carry out polymerization within a temperature range of from about 100° C. to about 200° C. At lower temperature than these the polymerization reaction appears to proceed very slowly under the previously specified pH conditions, whereas higher temperatures promote a tendency toward color formation, caramelization and other undesirable side effects. In some cases, it may be desirable to start polymerization at a lower temperature, say at 90° C. to 100° C., in order first to remove residual moisture from the product. Such a predrying step minimizes any tendency for the product to lump or fuse on subsequent application of higher temperatures.

In the matter of color formation tendency at high temperatures, it has been observed that the presence of the added formaldehyde has a beneficial effect in that a much lower color is obtainable with a given viscosity increase than is normally obtained in cases employing no formaldehyde.

The time required to carry out polymerization will depend on the temperature, pH, formaldehyde content, and D. E. of the material undergoing treatment as well as the degree of modification desired, and indeed is considerably subject to the type of equipment used. Due to the complexity of the situation, it is in fact not feasible to attempt to set forth the exact operating conditions for each product possible of production. The above description and examples to be given subsequently will enable persons skilled in the art to select the conditions of treatment best suited to obtain the products they desire.

The above process permits production of polysaccharides covering a wide range of viscosity and solubility. Depending on the D. E. of the starch hydrolyzate and amount of formaldehyde used, products can be made, on the one hand, having high viscosity, with complete or partial solubility, and, on the other hand, possessing relatively low viscosities with substantially complete solubility. The properties of the former type suggest usage in applications concerned primarily with colloid stabilization, thickening effects, sizes, and the like; the latter type appears eminently suited for application in the water-soluble adhesive field for such uses as paper lamination, remoistening adhesives, and the like.

The following examples are merely illustrative of the adaptability of the subject process in this connection and are not intended to be limiting in any sense.

EXAMPLE I

*Polymerization at different levels of formaldehyde concentration*

A corn starch conversion sirup having a rated D. E. of 16 to 20 percent and of approximately 50 percent solids content was split into 4 batches. To three of these was added sufficient commercial formalin (37 percent aqueous formaldehyde) to give sirups containing calculated dry basis formaldehyde concentrations of 0.8, 1.0, and 1.2 percent respectively (based on the sirup solids). For control purposes no formaldehyde was added to the fourth batch.

Each of the batches was dried to powder consistency by passage through a pilot plant sized spray drier of the so-called Bowen type (employing a rotating disc for dispersal in the drying chamber), the moisture content being about 2 to 3 percent.

Each of the products thereby obtained was blended with gaseous hydrochloric acid to a pH of 2.5 as measured on an aqueous solution containing 10 percent solids and subjected to heating in a dextrin cooker of laboratory size and design, with constant speed (75 R. P. M.) rotary agitation. The cycle used was 4 hours at cooker jacket temperatures ranging from about 100° C. at the start to 145° C. for the last 3 hours. The results are summarized in Table I.

TABLE I

| Run No. | 128—103 (Control) | 128—102B | 149—8 | 149—9 |
|---|---|---|---|---|
| Starting Sirup: | | | | |
| Total sirup solids, D. B. (percent) | | 47.5 | 47.4 | 47.4 |
| Formaldehyde content, D. B. (percent)— | | | | |
| Calculated | None | 0.8 | 1.0 | 1.2 |
| By analysis | | 0.78 | 0.95 | 1.18 |
| Sirup pH | 4.5 | 4.5 | 4.5 | 4.5 |
| Spray Dried Product: | | | | |
| D. E., D. B. (percent) | 18.6 | 18.5 | 18.6 | 18.4 |
| pH at 10% solids | 4.5 | 4.3 | 4.3 | 4.5 |
| Solubles (percent) | 100 | 100 | 100 | 100 |
| Moisture content | 6.5 | 5.0 | 4.2 | 3.7 |
| Formaldehyde content, D. B. (percent) | | 0.70 | 0.85 | 1.00 |
| Based on starting conc'n (percent) | | 89.7 | 89.5 | 84.7 |
| Polymerized Product: | | | | |
| Initial pH at 10% solids | 2.5 | 2.5 | 2.5 | 2.5 |
| Final pH at 10% solids | 3.3 | 3.35 | 3.6 | 3.6 |
| D. E. (percent) | 5.9 | 7.6 | 9.1 | 9.7 |
| Solubles (percent) | 100 | 100 | 100 | 93 |
| Viscosity of aq. soln.[1]— | | | | |
| at 10% solids, Ostwald (cp.) | 1.76 | 2.28 | 2.66 | [2] >2.6 |
| at 60% solids, Gardner (poises) | 12 | 46 | 60 | [3] >150 |
| Color at 60% solids (Hellige) | 13 | 9 | 8 | 8 |
| Formaldehyde content, D. B. (percent) | | 0.62 | 0.75 | 0.92 |
| Based on starting conc'n (percent) | | 79 | 79 | 78 |

[1] Viscosity of starting sirup solids before polymerization=1.59 cp. at 10% solids, Ostwald.
[2] Insolubles removed.
[3] Insolubles not removed.

The formaldehyde modified products without exception gave systems of permanent, high clarity and excellent flow, subsequent to hot dispersion in water to 60 percent solids. Solution length was considerably improved over that of the unmodified control. No tendency was observed for any of the high solids systems so prepared to thicken or thin out on storage or to develop any manifestations of insolubility.

The polymerized products were coated at 60 percent solids and 100 percent rag bond paper stock and tested for adhesion on remoistening followed by application of the remoistened coatings to uncoated stock. Rate of tack development and degree of final adhesiveness obtained were observed to be directly in line with the degree of viscosity modification obtained. All of the formaldehyde modified products were highly improved in these respects over the control unmodified product.

EXAMPLE II

*Effect of polymerization temperature on degree of formaldehyde modification*

Spray dried corn sirup was redissolved in water to make a sirup of roughly 50 percent solids. To this was added sufficient 37 percent aqueous formaldehyde to give a calculated concentration of 0.8 percent, on the dry basis. The resulting sirup was then spray dried in the same manner as described in Example I. The following data relate to the starting sirup and the spray dried product therefrom:

Starting sirup:
 D. E., D. B. (percent) _____ 17.6
 Solubles (percent) _____ 100
 Viscosity at 10% conc'n (cp.) _____ 1.64
 Formaldehyde content, D. B. (percent)—
  Calculated _____ 0.80
  By analysis _____ 0.84
 Total sirup solids, D. B. (percent) _____ 48.0
 pH _____ 4.2

Spray dried product:
 D. E., D. B. (percent) _____ 17.3
 pH at 10% solids _____ 4.7
 Solubles (percent) _____ 99.6
 Moisture content (percent) _____ 4.6
 Formaldehyde content, D. B. (percent) _____ 0.77
  Based on starting conc'n (percent) _____ 92

Samples of the spray dried product were blended with gaseous hydrochloric acid at a pH of 2.5 at 10 percent solids and subjected to heating in the laboratory dextrin cooker, described in Example I above, using the conditions of 4 hours at jacket temperatures of 145, 160 and 175° C. The results of these runs are summarized in Table II.

In addition to the difference in properties between the two products shown in the table, other significant differences were found. For example, product 128—96 gave translucent, highly thixotropic aqueous systems showing no gravity flow at 25° C. in Gardner viscometer tubes at solids concentrations higher than about 33 percent. Product 128—102A, on the other hand, gave crystal clear systems of excellent stability and flow at as high as 67 percent solids.

The following table summarizes Gardner viscometric data for the same two products as compared with control products similarly derived from the corresponding starting sirups without formaldehyde addition:

TABLE II

| Run No. | 149—28 | 149—29 | 149—30 |
|---|---|---|---|
| Jacket temperature of cooker (° C.) | 145±2 | 160±2 | 175±2. |
| pH at 10% solids: | | | |
| initial | 2.5 | 2.5 | 2.5. |
| final | 3.7 | 3.8 | 3.7. |
| D. E. (percent) | 8.8 | 6.4 | 4.8. |
| Solubles (percent) | 99 | 89 | 81. |
| Viscosity: | | | (Insolubles removed.) |
| at 10% solids, Ostwald (cp.) | 3.6 | | |
| at higher solids, Gardner (poises) | >150 at 60% solids; 25 at 50% | No flow >25% | No flow >25% (Insolubles not removed). |
| Color (Hellige) | 6 at 60% solids | 7 at 40% solids | 7 at 20% solids. |
| Formaldehyde content, D. B. (percent) | 0.75 | 0.72 | 0.70. |
| Based on starting conc'n (percent) | 90 | 86 | 83. |

In high solids (40 percent or above) aqueous solution, prepared using heat to obtain dispersion, all of the products listed gave homogeneous, perfectly clear and highly viscous systems. At concentrations of 20 to 25 percent, products 149—29 and 149—30 gave translucent, thixotropic jellies, showing substantially no tendency toward surface skin formation. At 60 percent solids, product 149—28 showed no tendency to thicken or gel on standing, and, as applied to 100 percent rag bond paper, was indicated to have excellent properties as a remoistening or laminating adhesive.

EXAMPLE III

Two corn starch conversion sirups (at 14.4 and 18.6 percent D. E. (D. B.), respectively) were processed in accordance with the procedure described in Example I above, the amount of formaldehyde added in each case prior to spray drying being sufficient to give a calculated 0.8 percent concentration (D. B.). The results obtained are summarized in Table III.

TABLE III

| Run No. | 128—96 | 128—102A |
|---|---|---|
| Starting Sirup: | | |
| D. E. of sirup solids, D. B. (percent) | 14.4 | 18.6 |
| Solubles of sirup solids (percent) | 100 | 100 |
| Viscosity of sirup solids at 10% conc'n (cp.) | 1.69 | 1.59 |
| Formaldehyde content of sirup, D. B. (percent) | 0.76 | 0.78 |
| Total sirup solids | 47.7 | 47.5 |
| pH of sirup | 4.7 | 4.5 |
| Spray Dried Product: | | |
| D. E., D. B. (percent) | 14.2 | 18.5 |
| pH at 10% solids | 4.8 | 4.3 |
| Solubles (percent) | 93.8 | 100 |
| Moisture content (percent) | 5.7 | 5.0 |
| Formaldehyde content, D. B. (percent) | 0.70 | 0.70 |
| Based on starting conc'n (percent) | 92.1 | 89.7 |
| Polymerized Product: | | |
| pH at 10% solids— | | |
| initial | 2.5 | 2.5 |
| final | 3.5 | 3.4 |
| D. E. (percent) | 4.4 | 7.3 |
| Solubles (percent) | 88 | 100 |
| Viscosity of centrifuged 10% soln. (cp.) | 2.32 | 2.25 |
| Formaldehyde content, D. B. (percent) | 0.56 | 0.60 |
| Based on starting conc'n (percent) | 74 | 77 |

| Product No. | 128—33 (14.4 D. E. Control) | 128—96 | 128—103 (18.6 D. E. Control) | 128—102A |
|---|---|---|---|---|
| D. E. (percent) | 5.4 | 4.4 | 5.9 | 7.3 |
| Vis. (Gardner) 25° C. (poises): | | | | |
| at 60% solids | 19 | No flow 33% | 12 | 36 |
| at 67% solids | 150 | | 80 | 150 |

Both formaldehyde-modified products showed efficient adhesiveness, with regard to lamination of 100 percent rag bond paper stock, whereas the corresponding control products did not give a satisfactory bond.

EXAMPLE IV

In this example, phosphoric acid was used as catalyst and was added to the starch hydrolyzates prior to spray drying. Spray dried corn sirup solids having a D. E. of 20 percent were added to hot water to provide a sirup containing 50 percent solids. To this sirup was added sufficient phosphoric acid (85%) to give a concentration of 0.5 percent (as anhydrous $H_3PO_4$), based on the calculated corn sirup solids, together with sufficient water to compensate for evaporation loss. The acidified sirup having a pH of 1.8 was divided into six portions A, B, C, D, E, and F, to each of which was added sufficient aqueous formaldehyde (37%) to give the sirups a formaldehyde content, respectively, of 0.0, 0.25, 0.50, 0.75, 1.00 and 1.25 percent (as anhydrous formaldehyde, based on the calculated sirup solids). After standing at room temperature for 24 hours, the samples were spray dried in a Bowen type drier in conventional manner. The dried samples were divided in half, except E and F, and then each sample was heated in a laboratory rotary cooker and polymerized. The conditions of the heat treatment and the analytical results obtained on the products are summarized in Table IV.

The data show that loss of solubility begins when more than about 0.75 percent formaldehyde is used. Samples E and F, containing more than this, were not heated above 145° C. because of loss of solubility occurring at this temperature.

Formaldehyde modification appears to promote higher clarity and lower color than obtained without such modification.

TABLE IV

| Run No. | A | B | C | D | E | F |
|---|---|---|---|---|---|---|
| Initial pH | 1.8 | 1.8 | 1.8 | 1.8 | 1.8 | 1.8 |
| HCHO content D. B. (percent): | | | | | | |
| Calculated | 0.0 (control) | 0.25 | 0.50 | 0.75 | 1.00 | 1.25 |
| By analysis | 0.0 | 0.16 | 0.43 | 0.69 | 0.90 | 1.10 |
| Haze No. (percent): | | | | | | |
| Initial | 100 | 100 | 100 | 90 | 77 | 64 |
| 24 hrs | 100 | 100 | 100 | 100 | 100 | 100 |
| After Spray Drying: | | | | | | |
| Moisture (percent) | 4.34 | 4.08 | 3.91 | 4.56 | 4.20 | 4.67 |
| D. E., D. B. (percent) | 17.4 | 17.2 | 17.5 | 17.0 | 17.7 | 17.8 |
| pH at 10% solids | 2.45 | 2.45 | 2.5 | 2.45 | 2.45 | 2.5 |
| HCHO content D. B. (percent)— | | | | | | |
| Free (no hydrolysis) | 0.0 | 0.10 | 0.29 | 0.48 | 0.73 | 0.93 |
| Total (after hydrolysis) | 0.0 | 0.12 | 0.34 | 0.52 | 0.76 | 0.98 |
| Polymerization: | | | | | | |
| Temperature, °C | 145 / 160 | 145 / 160 | 145 / 160 | 145 / 160 | 145 | 145 |
| Time (hrs.) | 4 / 3 | 4 / 3 | 4 / 3 | 4 / 3 | 4 | 4 |
| After Polymerization: | | | | | | |
| pH at 10% solids, Final | 2.5 / 2.55 | 2.5 / 2.55 | 2.5 / 2.55 | 2.45 / 2.5 | 2.5 | 2.5 |
| D. E. | 7.4 / 7.0 | 7.6 / 6.9 | 7.4 / 7.1 | 7.1 / 7.6 | 7.6 | 7.6 |
| HCHO content: | | | | | | |
| Free | 0.0 / 0.0 | 0.0 / 0.0 | 0.0 / 0.0 | 0.0 / 0.0 | 0.0 | 0.0 |
| Total | 0.0 / 0.0 | 0.16 / 0.15 | 0.34 / 0.30 | 0.52 / 0.53 | 0.72 | 0.96 |
| Solubility (percent) | 100 / 100 | 100 / 100 | 100 / 100 | 95.0 / 96.2 | 85.8 | 82.3 |
| Viscosity at 72 F. (poises) Brookfield— | | | | | | |
| 67% solids | 112 / 123 | 182 / 288 | 370 / 420 | 2,000 / >2,000 | no flow >33% | no flow >20% |
| 60% solids | 15.0 / 22.5 | 22.0 / 26.2 | 37 / 51 | 146 / 195 | | |
| Color at 60% solids (Hellige) | 9+ / 12+ | 9 / 10+ | 8+ / 9+ | 8+ / 9 | | |

EXAMPLE V

In this example boric acid was used as catalyst for polymerization. Corn sirup having a D. E. of 40 percent and a density of 42° Bé. was diluted to 50 percent solids. To this was added 6 percent of boric acid, based on the solids, and sufficient 37 percent aqueous formaldehyde to correspond to a 1.0 percent concentration (calculated as anhydrous formaldehyde, based on the sirup solids). The mixture was heated to dissolve the boric acid and then allowed to stand for 48 hours at room temperature.

The sirup was spray dried using a pilot plant scale Bowen type drier with inlet temperature of about 350° F. The spray dried product was then placed in a laboratory scale dextrin cooker employing a rotary agitator and subjected to polymerization using a heating cycle of 4 hours at a maximum jacket temperature of 145 ± 2° C.

Analytical data pertaining to the products are as follows:

| | Formaldehyde Content D. B. (Percent) | D. E., D. B. (Percent) | Viscosity at 67% Solids and 72° F. (Poises) |
|---|---|---|---|
| Spray dried product | 0.92 | 42.5 | 3.7 |
| Polymerized product | 0.84 | 22.6 | 31.5 |
| Polymerized product, no formaldehyde | None | 18.0 | 15 |

The pH was 4.3 on a 10 percent solution of the polymerized product.

The product polymerized in contact with formaldehyde has excellent solubility and stability characteristics. However, the adhesive and color properties are not quite as good as those of products obtained from corn sirup having lower D. E. values.

While the process of our invention has emphasized the use of corn (maize) starch conversion sirup, other starch conversion sirups, such as, for example, grain sorghum, potato, rice, wheat, tapioca, may likewise be used with good results.

I claim:
1. A process for producing a carbohydrate material which comprises dehydrating a starch hydrolysis liquor having a D. E. value from about 5 to about 40 to a moisture content below about 10 percent, heating the dried product in contact with formaldehyde and in the presence of an acid catalyst at a pH of from about 1.5 to about 4.5 and at a temperature between about 90° C. and 200° C. to polymerize components of said product; the amount of formaldehyde not exceeding about 2 percent calculated as anhydrous aldehyde based on the dehydrated substance.

2. A process for producing a carbohydrate material which comprises dehydrating a starch hydrolysis sirup having a D. E. value of about 20 and a pH value of about 4.5 to 5.5 to a moisture content below about 10 percent, blending with the dried product sufficient hydrochloric acid to adjust the pH thereof to 2.5 and with 1 percent of formaldehyde calculated as anhydrous aldehyde based on the dried substance, and thereafter heating the mixture at a temperature within the range of about 100° C. to 145° C. thereby to polymerize components of said product.

3. A process for producing a carbohydrate material which comprises spray drying a starch hydrolysis liquor having a D. E. value of from about 5 to about 40 containing formaldehyde and phosphoric acid, to reduce the moisture content to below 10 percent, thereafter heating the dried material at a temperature not exceeding about 200° C. to polymerize components of said product, and continuous removing water formed by the polymerization reaction during the said heating step; the amount of formaldehyde not exceeding about 2 percent calculated as anhydrous aldehyde, based on the dried substance, and the pH of the liquor being about 1.5 to about 4.5.

References Cited in the file of this patent

UNITED STATES PATENTS

| | | |
|---|---|---|
| 1,018,736 | Alsleben | Feb. 27, 1912 |
| 2,510,748 | Lolkema et al. | June 6, 1950 |
| 2,563,014 | Durand | Aug. 7, 1951 |
| 2,698,936 | Staerkle et al. | Jan. 4, 1955 |
| 2,698,937 | Staerkle et al. | Jan. 4, 1955 |